United States Patent
Okinaka et al.

(10) Patent No.: US 6,783,608 B2
(45) Date of Patent: *Aug. 31, 2004

(54) SECONDARY AGGLOMERATES OF MAGNETIC METAL PARTICLES FOR MAGNETIC RECORDING AND PROCESS FOR PRODUCING THE SAME

(75) Inventors: Kenji Okinaka, Ube (JP); Kohji Mori, Onoda (JP); Masayuki Uegami, Onoda (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 94 days.

This patent is subject to a terminal disclaimer.

(21) Appl. No.: 10/128,574

(22) Filed: Apr. 24, 2002

(65) Prior Publication Data

US 2002/0189715 A1 Dec. 19, 2002

(30) Foreign Application Priority Data

Apr. 27, 2001 (JP) ........................................ 2001-133691

(51) Int. Cl.$^7$ .............................. H01F 1/06; H01F 1/20
(52) U.S. Cl. ...................... 148/306; 148/301; 148/311; 75/348; 75/352; 75/365
(58) Field of Search ................................ 148/301, 306, 148/311; 420/77, 80, 83, 103; 75/348, 352, 365

(56) References Cited

U.S. PATENT DOCUMENTS

| | | | |
|---|---|---|---|
| 4,470,844 A | | 9/1984 | Rademachers et al. |
| 4,774,012 A | | 9/1988 | Ishikawa et al. |
| 5,962,125 A | | 10/1999 | Masaki |
| 6,391,450 B1 | | 5/2002 | Okinaka et al. |
| 6,447,618 B1 | * | 9/2002 | Mori et al. .................. 148/105 |
| 2002/0022152 A1 | * | 2/2002 | Okinaka et al. ........ 428/694 R |
| 2003/0044648 A1 | * | 3/2003 | Mori et al. ........... 428/694 BA |

FOREIGN PATENT DOCUMENTS

| | | |
|---|---|---|
| DE | 37 02 161 A1 | 8/1987 |
| EP | 0 054 818 A1 | 6/1982 |
| EP | 1 053 975 A1 | 11/2000 |
| EP | 001253583 A1 * | 10/2002 |

\* cited by examiner

Primary Examiner—John P. Sheehan
(74) Attorney, Agent, or Firm—Nixon & Vanderhye P.C.

(57) ABSTRACT

Secondary agglomerates of magnetic metal particles for magnetic recording, have a sodium content of not more than 20 ppm and a calcium content of not more than 40 ppm, an average particle diameter of 300 to 800 μm and an upper limit of particle diameters of 2,000 μm, and comprise magnetic metal primary particles having an average major axis diameter of 0.05 to 0.25 μm.

9 Claims, No Drawings

SECONDARY AGGLOMERATES OF MAGNETIC METAL PARTICLES FOR MAGNETIC RECORDING AND PROCESS FOR PRODUCING THE SAME

BACKGROUND OF THE INVENTION

The present invention relates to secondary agglomerates of magnetic metal particles for magnetic recording and a process for producing the same, and more particularly, to secondary agglomerates of magnetic metal particles containing iron as a main component, which exhibit not only an excellent dispersibility but also a less soluble salt content while maintaining good magnetic properties.

In recent years, miniaturization, lightening, recording-time prolongation and high-density recording of magnetic recording and reproducing apparatuses for audio, video or computer as well as increase in memory capacity thereof have proceeded more rapidly. With such a recent tendency, it has been increasingly required to provide magnetic recording media having a high performance and a high-density recording property, such as magnetic tapes and magnetic disks.

Namely, the magnetic recording media have been required to have high image definition and quality, high output characteristics such as, in particular, good frequency characteristics, an excellent keeping property and a high durability. Therefore, it has been required that the magnetic recording media are reduced in noise due to the magnetic recording media, and exhibit a high coercive force Hc, a narrow coercive force distribution (Switching Field Distribution: SFD) and an excellent weather resistance ($\Delta$Bm).

These properties of the magnetic recording media have a close relation to magnetic particles used therein. In recent years, magnetic metal particles containing iron as a main component have been noticed because the magnetic metal particles can show a higher coercive force and a larger saturation magnetization $\sigma$s as compared to those of conventional magnetic iron oxide particles, and have been already used as magnetic particles for magnetic recording media such as digital audio tapes (DAT), 8-mm video tapes, Hi-8 tapes, W-VHS tapes for Hi-Vision, DVC tapes of digital recording type, etc., as well as removable disks for computers such as Zip disks and Super disks. Further, it has been recently attempted to practically apply the magnetic metal particles containing iron as a main component to large-capacity Hi-FD.

Therefore, it has also been strongly required to improve properties of the magnetic metal particles containing iron as a main component.

More specifically, in order to obtain magnetic recording media having a higher coercive force, an excellent coercive force distribution SFD and an excellent weather resistance $\Delta$Bm, the magnetic metal particles containing iron as a main component, which are used as magnetic particles therein, have been strongly required to show a higher coercive force and a larger saturation magnetization as well as a narrower particle size distribution, an excellent dispersibility and an excellent oxidation stability $\Delta\sigma$s.

In addition, in order to obtain magnetic recording media having a high recording density, a high reliability and an improved durability, the magnetic metal particles have been required to have a less soluble salt content.

The above facts are described in detail below.

In general, the magnetic metal particles containing iron as a main component are produced by using as a starting material, (i) spindle-shaped goethite particles obtained by passing an oxygen-containing gas such as air through a suspension containing a ferrous-containing precipitate obtained by reacting an aqueous ferrous salt solution with an aqueous alkali solution containing sodium hydroxide, potassium hydroxide or sodium carbonate for conducting an oxidation reaction of the suspension, (ii) spindle-shaped hematite particles obtained by heat-dehydrating the spindle-shaped goethite particles, or (iii) spindle-shaped particles obtained by incorporating metal elements other than iron into the above spindle-shaped goethite or hematite particles; and then heat-reducing the starting material in a reducing gas atmosphere.

The thus obtained spindle-shaped magnetic metal particles inevitably contain sodium or calcium owing to the above production process. When the magnetic metal particles containing a soluble sodium salt or a soluble calcium salt are used for producing magnetic recording media, there arises such a problem that compounds derived from the soluble sodium salt or the soluble calcium salt tend to be precipitated on a magnetic coating film thereof. As to this fact, Japanese Patent Application Laid-Open (KOKAI) No. 8-186015(1996) describes that " . . . in the case where such Fe-containing magnetic metal particles having an increased soluble ion content are used for producing magnetic recording media, although initial properties of the magnetic recording media are excellent, the soluble ion tends to be precipitated in the form of insoluble salts when stored under high-temperature and high-humidity conditions, resulting in problems such as drop-out (DO) and deteriorated output characteristics of the obtained products".

In order to reduce the amount of soluble salts contained in the magnetic metal particles, there have been adopted (1) the method of non-using of aqueous alkali solutions containing alkali metal salts such as sodium hydroxide, as starting materials, and (2) the method of washing the magnetic metal particles with water to remove the soluble salt therefrom. Meanwhile, the present invention relates to the method (2).

In the case of the above water-washing method, it will be considered that the respective products obtained in each intermediate step of the production process of the magnetic metal particles are washed with water. However, even if the goethite particles or the hematite particles as the starting material are washed with water, only the soluble salts contained inside of these particles are removed, and it is known that when these starting particles are subjected to reduction reaction to produce the magnetic metal particles, insoluble impurities contained therein are transferred onto the surface of the particles and precipitated thereon in the form of soluble salts. As to this fact, Japanese Patent Application Laid-Open (KOKAI) No. 7-22224(1995) describes that " . . . in order to reduce the content of elements of Group 1a of the Periodic Table to not more than 0.05% by weight, it is necessary to conduct an additional step for removing these element if they are inevitably mixed into the particles in the course of the production process, . . . in particular, as the process proceeds from iron oxide hydroxide to iron oxide and then to magnetic metal particles, these elements are more remarkably precipitated at the surface of the particle . . . ". On the other hand, when the magnetic metal particles, especially spindle-shaped magnetic metal particles, are washed with water, magnetic properties thereof such as coercive force tend to be deteriorated, and the dispersibility thereof in a magnetic coating composition also tends to be lowered.

As conventional techniques for reducing the contents of impurities such as soluble sodium by washing the magnetic metal particles with water, there are known the methods described in Japanese Patent Application Laid-Open Nos. 56-51029(1981), 7-22224(1995), 8-172005(1996), 8-186015(1996) and 9-305958(1997) or the like.

Meanwhile, as known in the art, the magnetic metal particles have been produced by granulating a starting material such as goethite particles and hematite particles obtained by heat-dehydrating the goethite particles, into an adequate size, and then heat-reducing the granulated product.

In general, upon the production of coating-type magnetic recording media, the granulated product of the magnetic metal particles is directly charged into a kneading apparatus such as kneader, and kneaded therein with various binder resins and organic solvents. The kneaded material is diluted and dispersed in an additional amount of the organic solvent to prepare a magnetic coating composition, and then the obtained magnetic coating composition is coated onto a non-magnetic base film.

As described above, the surface smoothness of a magnetic coating film largely depends upon the dispersibility of the magnetic metal particles contained therein. Also, the poor dispersibility of the magnetic metal particles causes deterioration in squareness of the obtained magnetic coating film. For these reasons, it has been strongly required that the magnetic metal particles can show an excellent dispersibility, and the granulated product of the magnetic metal particles can be readily deagglomerated into magnetic metal particles as primary particles thereof.

At present, it has been strongly required to provide spindle-shaped magnetic metal particles containing iron as a main component which can exhibit an excellent dispersibility and a less soluble salt content while maintaining good magnetic properties. However, such spindle-shaped magnetic metal particles containing iron as a main component capable of satisfying these requirements have not been obtained yet.

That is, Japanese Patent Application Laid-Open (KOKAI) No. 56-51029(1981) describes that acicular magnetic metal particles are washed with an aqueous solvent such as water or a mixture of water and organic solvent (water content: 50% or higher). Although this KOKAI No. 56-51029 describes the use of water or the mixed solution composed of water and organic solvent upon water-washing treatment as well as the surface tension of water upon drying, the configuration of secondary agglomerates upon the water-washing is not taken into consideration at all.

Also, Japanese Patent Application Laid-Open (KOKAI) No. 7-22224(1995) describes that hematite particles and magnetic metal particles are washed with water. However, there is not described at all the configuration of secondary agglomerates upon water-washing in the consideration of surface tension of water upon drying.

Japanese Patent Application Laid-Open (KOKAI) No. 8-172005(1996) describes that spindle-shaped goethite particles and spindle-shaped hematite particles are heat-reduced, surface-oxidized, water-washed and then dried. However, in this KOKAI No. 8-172005, since neither configuration of secondary agglomerates upon water-washing treatment nor surface tension of water upon drying is taken into consideration, it will be difficult to attain a sufficient water-washing efficiency.

Japanese Patent Application Laid-Open (KOKAI) No. 8-186015(1996) describes that goethite particles or hematite particles are washed with water. However, this method fails to sufficiently reduce the soluble salt content. Further, as shown in Comparative Examples of this KOKAI No. 8-186015, the water-washed magnetic metal particles were deteriorated in magnetic properties.

Japanese Patent Application Laid-Open (KOKAI) No. 9-305958(1997) describes that water-washed magnetic metal particles are subjected again to reduction reaction and surface oxidation. However, since neither the configuration of secondary agglomerates upon water-washing nor the surface tension of water upon the reduction reaction and surface oxidation is taken into consideration at all, it may be difficult to obtain magnetic metal particles having an excellent dispersibility.

As a result of the present inventors' earnest studies for solving the above problems, it has been found that by granulating and shaping a starting material such as goethite particles having an average major axis diameter of 0.05 to 0.40 $\mu$m as primary particles, or hematite particles obtained by heat-dehydrating the goethite particles; heat-reducing the resultant granulated product to obtain a granulated product of magnetic metal particles; deaggregating the obtained granulated product of magnetic metal particles using an apparatus having a crushing function for crushing the granulated product of magnetic metal particles by a rotor and a sizing function for forcibly passing the crushed product through a screen; and subjecting the obtained crude secondary agglomerates of magnetic metal particles to water-washing and then drying, the thus obtained secondary agglomerates of magnetic metal particles exhibit not only a less soluble salt content, but also an excellent dispersibility while keeping good magnetic properties. The present invention has been attained on the basis of this finding.

SUMMARY OF THE INVENTION

An object of the present invention is to provide secondary agglomerates of magnetic metal particles containing iron as a main component, which can exhibit not only a less soluble salt content but also an excellent dispersibility while keeping good magnetic properties, and further can produce a magnetic coating film having more excellent surface smoothness and squareness.

Another object of the present invention is to provide a process for producing the above secondary agglomerates of magnetic metal particles in an efficient and industrially advantageous manner.

To accomplish the aims, in a first aspect of the present invention, there are provided secondary agglomerates of magnetic metal particles for magnetic recording, having a sodium content of not more than 20 ppm and a calcium content of not more than 40 ppm, an average particle diameter of 300 to 800 $\mu$m and an upper limit of particle diameters of 2,000 $\mu$m, and comprising magnetic metal primary particles having an average major axis diameter of 0.05 to 0.25 $\mu$m.

In a second aspect of the present invention, there are provided secondary agglomerates of magnetic metal particles for magnetic recording, having an average particle diameter of 300 to 800 $\mu$m and an upper limit of particle diameters of 2,000 $\mu$m, wherein an amount of agglomerates having particle diameters of not more than 53 $\mu$m is not more than 30% by weight, a repose angle of repose of 38° to 45°, a water content of 0.5 to 1.5% by weight, a Co content of 0.5 to 45 atm %, an Al content of 5 to 20 atm %, and a rare earth element content of usually 1 to 15 atm %, a sodium content of not more than 20 ppm and a calcium content of not more than 40 ppm; comprising magnetic metal primary particles having an average major axis diameter of 0.05 to 0.25 $\mu$m.

In a third aspect of the present invention, there are provided secondary agglomerates of magnetic metal particles for magnetic recording, having a coercive force of 111.4 to 143.2 kA/m (1,400 to 1,800 Oe), a Co content of from 0.5 to less than 5 atm % based on whole Fe, a sodium content of not more than 20 ppm, a calcium content of not more than 40 ppm, a $\Delta\sigma s$ value of not more than 5.0%, and an ignition temperature of not less than 150° C., an average particle diameter of 300 to 800 μm and an upper limit of particle diameter of 2,000 μm; and comprising spindle-shaped magnetic metal particles containing iron as a main component having an average major axis diameter (L) of 0.05 to 0.15 μm, a crystallite size of from 150 to less than 170 Å and a specific surface area (S) represented by the following formula:

$$S \leq -160 \times L + 65.$$

In a fourth aspect of the present invention, there is provided a process for producing secondary agglomerates of magnetic metal particles as defined in claim 1, comprising:

granulating and shaping goethite particles comprising primary particles having an average major axis diameter of 0.05 to 0.40 μm or hematite particles obtained by heat-dehydrating the goethite particles as a starting material;

heat-reducing the resultant granulated product of the goethite or hematite particles to obtain a granulated product of magnetic metal particles;

deaggregating the obtained granulated product of magnetic metal particles using an apparatus having a crushing function for crushing the granulated product of magnetic metal particles by a rotor and a sizing function for forcibly passing the crushed particles through a screen, thereby obtaining crude secondary agglomerates of magnetic metal particles; and subjecting the crude secondary agglomerates to water-washing and then drying.

In a fifth aspect of the present invention, there is provided a process for producing secondary agglomerates of magnetic metal particles as defined in claim 1, comprising:

(1) producing spindle-shaped goethite particles by (i) forming spindle-shaped goethite seed crystal particles by (a) reacting an aqueous ferrous salt solution with a mixed aqueous alkali solution of an aqueous alkali carbonate solution and an aqueous alkali hydroxide solution to obtain a water suspension containing a ferrous-containing precipitate, (b) aging the resultant water suspension containing the ferrous-containing precipitate in a non-reducing atmosphere; and then (c) passing an oxygen-containing gas through the water suspension containing the ferrous-containing precipitate to conduct an oxidation reaction thereof; and (ii) growing a goethite layer on surface of the goethite seed crystal particles by passing an oxygen-containing gas through the water suspension containing the goethite seed crystal particles and the ferrous-containing precipitate, wherein a Co compound is added in an amount of 0.5 to 45 atm %, calculated as Co, based on whole Fe, to the water suspension containing the ferrous-containing precipitate during the aging of the water suspension prior to elapse of 20% of whole aging time before initiation of the oxidation reaction, thereby conducting the oxidation reaction such that 30 to 50% of whole $Fe^{2+}$ is oxidized, while passing the oxygen-containing gas through the water suspension at a superficial velocity of 2.3 to 3.5 cm/s; and then after adding an Al compound in an amount of 5 to 20 atm %, calculated as Al, based on whole Fe, to the water suspension, the oxidation reaction is further conducted to produce the spindle-shaped goethite particles;

(2) adding to the water suspension containing the spindle-shaped goethite particles obtained in the step (1), an anti-sintering agent comprising a rare earth compound in an amount of 1 to 15 atm %, calculated as a rare earth element, based on whole Fe, to obtain spindle-shaped goethite particles coated with the rare earth compound, and optionally heat-treating the spindle-shaped goethite particles at a temperature of 650 to 800° C. in a non-reducing atmosphere to obtain spindle-shaped hematite particles;

(3) granulating and shaping the spindle-shaped goethite particles or spindle-shaped hematite particles obtained in the step (2); introducing the granulated product of the spindle-shaped goethite particles or spindle-shaped hematite particles into a reducing apparatus to form a fixed bed having a height of 3 to 15 cm; heating the granulated product of the spindle-shaped goethite particles or spindle-shaped hematite particles to a temperature of 400 to 700° C. at a temperature rise rate of 10 to 80° C./minute while flowing a reducing gas through the fixed bed at a superficial velocity of 40 to 150 cm/s to reduce the granulated product of the spindle-shaped goethite particles or spindle-shaped hematite particles; and subjecting the obtained granulated product of the spindle-shaped metal particles to surface oxidation to form a surface oxide film on surface thereof, thereby obtaining the granulated product of magnetic metal particles containing iron as a main component;

(4) deaggregating the obtained granulated product of magnetic metal particles using an apparatus having a crushing function for crushing the granulated product of magnetic metal particles by a rotor and a sizing function for forcibly passing the crushed particles through a screen, thereby obtaining crude secondary agglomerates of magnetic metal particles; and (5) subjecting the crude secondary agglomerates of magnetic metal particles to water-washing and then drying

DETAILED DESCRIPTION OF THE INVENTION

First, the secondary agglomerates of magnetic metal particles having a reduced soluble salt content according to the present invention are described.

The secondary agglomerates of magnetic metal particles according to the present invention have an average particle diameter of usually 300 to 800 μm, preferably 400 to 800 μm; an upper limit of granulated particle diameter of usually 2,000 μm; and an repose angle of usually 38 to 45°, preferably 39 to 44°.

When the average particle diameter is less than 300 μm, the repose angle of the secondary agglomerates tends to be increased, resulting in deteriorated flowability thereof. When the average particle diameter is more than 800 μm, it is difficult to obtain secondary agglomerates having good kneading property and dispersibility.

When the upper limit of granulated particle diameter of the secondary agglomerates is more than 2,000 μm, it is difficult to obtain secondary agglomerates having good kneading property and dispersibility.

The secondary agglomerates of the present invention contain those having a diameter of not more than 53 μm in an amount of usually not more than 30% by weight, preferably not more than 20% by weight. When the content of such agglomerates having a diameter of not more than 53 μm is more than 30% by weight, the obtained secondary agglomerates tend to show a large repose angle and deteriorated flowability, resulting in poor handling property thereof.

When the repose angle is more than 45°, the obtained secondary agglomerates also tend to be considerably deteriorated in flowability, resulting in poor handling property thereof.

The secondary agglomerates of magnetic metal particles according to the present invention are obtained by deaggregating a cylindrical granulated product of magnetic metal particles and, therefore, have an amorphous shape.

The secondary agglomerates of magnetic metal particles according to the present invention have a Co content of usually 0.5 to 45 atm %, preferably from 0.5 atm % to less than 5 atm %, more preferably from 2 atm % to less than 5 atm % based on whole Fe, an Al content of usually 5 to 20 atm %, preferably 5 to 10 atm %, more preferably 5 to 9 atm % based on whole Fe; and a rare earth element content of usually 1 to 15 atm %, preferably 1.5 to 5 atm %, more preferably 2 to 5 atm % based on whole Fe.

The secondary agglomerates of magnetic metal particles according to the present invention have a sodium content of usually not more than 20 ppm, preferably 0 to 10 ppm; and a calcium content of usually not more than 40 ppm, preferably 0 to 30 ppm. When the sodium or calcium content of the secondary agglomerates exceeds the above-specified range, it may be difficult to attain a good dispersibility in magnetic coating film as well as enhanced weather resistance.

The secondary agglomerates of magnetic metal particles according to the present invention preferably have a water content of 0.5 to 1.5% by weight.

The secondary agglomerates of magnetic metal particles according to the present invention have a bulk density of preferably 0.45 to 0.90 g/ml, more preferably 0.50 to 0.85 g/ml, still more preferably 0.55 to 0.80 g/ml.

As to magnetic properties of the secondary agglomerates of magnetic metal particles according to the present invention, the coercive force thereof is usually 111.4 to 143.2 kA/m (1,400 to 1,800 Oe); and the saturation magnetization thereof is usually 120 to 140 Am$^2$/kg (120 to 140 emu/g).

As primary particles of the magnetic metal particles constituting the secondary agglomerates of magnetic metal particles according to the present invention, there may be exemplified the following magnetic metal primary particles.

The magnetic metal primary particles are magnetic metal particles containing iron as a main component, which have an average major axial diameter of usually 0.05 to 0.25 μm, preferably 0.05 to 0.15 μm. When the average major axial diameter is less than 0.05 μm, the magnetic metal particles containing iron as a main component have a too small particle size so as to be close to a particle size exhibiting superparamagnetism, resulting in deteriorated saturation magnetization and coercive force. Further, such too small magnetic metal particles containing iron as a main component show a poor dispersibility in coating composition, so that the oxidation stability thereof tends to be deteriorated. When the average major axial diameter is more than 0.25 μm, the magnetic metal particles containing iron as a main component have a too large particle size. As a result, a magnetic coating film produced using such large particles tends to be deteriorated in surface smoothness, so that it is difficult to improve output characteristics thereof.

The magnetic metal particles containing iron as a main component are preferably of an acicular shape, and have an aspect ratio of preferably 4:1 to 13:1. Here, the "acicular" particles include spindle-shaped particles and rice ball-shaped particles in addition to literally acicular particles. When the aspect ratio is less than 4:1, magnetic metal particles containing iron as a main component having the aimed coercive force tend not to be obtained. When the aspect ratio is more than 13:1, the oxidation stability of the obtained magnetic metal primary particles tends to be deteriorated though it varies depending upon the major axial diameter thereof. In the case of the spindle-shaped particles, the aspect ratio thereof is more preferably 5:1 to 9:1.

The magnetic metal primary particles of the present invention preferably have a BET specific surface area (S) satisfying the following formula:

$$S \leq -160 \times L + 65$$

wherein L represents an average major axis diameter.

When the BET specific surface area exceeds the range specified by the above formula, it may be difficult to attain an excellent oxidation stability. Meanwhile, the lower limit of the BET specific surface area is preferably 35 m$^2$/g. When the BET specific surface area is less than 35 m$^2$/g, the particles tend to already suffer from sintering upon the heat-reduction step, so that it may be difficult to obtain a magnetic coating film having an improved squareness.

Concretely, the BET specific surface area of the magnetic metal particles containing iron as a main component is preferably 35 to 65 m$^2$/g, more preferably 40 to 60 m$^2$/g. When the BET specific surface area is less than 35 m$^2$/g, the particles are already sintered upon the previous heat-reduction step, so that it may be difficult to improve a squareness of a magnetic coating film produced using such particles. When the BET specific surface area is more than 65 m$^2$/g, the obtained magnetic metal primary particles tend to show a too high viscosity in the coating composition, resulting in poor dispersibility thereof.

The magnetic metal primary particles of the present invention have a size distribution (standard deviation/average major axis diameter) of preferably not more than 0.30. The size distribution of the magnetic metal primary particles is preferably as low as possible. Although the lower limit of the size distribution is not particularly restricted, the size distribution of the magnetic metal primary particles is suitably not less than about 0.10 from the standpoint of industrial production thereof. When size distribution of the magnetic metal primary particles is more than 0.30, the obtained particles tend to be deteriorated in oxidation stability, and a magnetic coating film produced using such particles tends to be deteriorated in SFD, thereby failing to achieve high-density recording thereon.

The magnetic metal primary particles of the present invention have a Co content of usually 0.5 to 45 atm %, preferably from 0.5 atm % to less than 5 atm %, more preferably from 2 atm % to less than 5 atm % based on whole Fe. When the Co content of the magnetic metal primary particles is less than 0.5 atm %, the effect of enhancing magnetic properties thereof may not be attained. When the Co content of the magnetic metal primary particles is more than 45 atm %, it may be difficult to adequately control the particle size thereof, resulting in economically disadvantage process.

The magnetic metal primary particles of the present invention have an Al content of usually 5 to 20 atm %, preferably 5 to 10 atm %, more preferably 5 to 9 atm % based on whole Fe; and a rare earth element content of usually 1 to 15 atm %, preferably 1.5 to 5 atm %, more preferably 2 to 5 atm % based on whole Fe.

When the Al content of the magnetic metal primary particles is less than 5 atm %, the obtained particles, especially those having a small particle size, tend to exhibit a too high coercive force, so that it may be difficult to adequately control the coercive force. When the Al content of the magnetic metal primary particles is more than 20 atm %, it may also be difficult to adequately control the coercive force of the obtained particles, especially those having a small aspect ratio. When the rare earth element content of the magnetic metal primary particles is less than 1 atm %, a sufficient anti-sintering effect may not be attained. Further, the obtained magnetic metal particles tend to be deteriorated in size distribution, and the magnetic coating film produced using such particles tends to be deteriorated in SFD. When the rare earth element content of the magnetic metal primary particles is more than 15 atm %, the obtained particles tend to be deteriorated in saturation magnetization.

The magnetic metal primary particles of the present invention have a crystallite size $D_{110}$ of preferably from 150 to less than 170 Å, more preferably 150 to 165 Å. When the crystallite size $D_{110}$ is less than 150 Å, although the obtained magnetic recording media are advantageously reduced in noise due to particles, the saturation magnetization and oxidation stability thereof both tend to be deteriorated. When the crystallite size $D_{110}$ is not less than 170 Å, the noise due to particles tends to be increased.

The magnetic metal primary particles of the present invention have a coercive force Hc of usually 103.5 to 206.9 kA/m (1,300 to 2,600 Oe), preferably 111.4 to 143.2 kA/m (1,400 to 1,800 Oe) and a saturation magnetization as of usually 110 to 160 $Am^2/kg$ (110 to 160 emu/g), preferably 120 to 140 $Am^2/kg$ (120 to 140 emu/g).

The magnetic metal primary particles of the present invention have an oxidation stability ($\Delta\sigma s$) of saturation magnetization ($\sigma s$) of preferably not more than 5.0%, more preferably not more than 3% as an absolute value when subjected to an accelerated deterioration test at a temperature of 60 and a relative humidity of 90% for one week; and a ignition temperature of preferably not less than 150° C., more preferably not less than 155° C. When the oxidation stability. ($\Delta\sigma s$) of saturation magnetization or the ignition temperature is out of the above-specified range, the obtained particles may fail to show a sufficient oxidation stability.

As to properties of a coating film produced using the secondary agglomerates of magnetic metal particles according to the present invention, when the coating film is magnetically oriented in a magnetic field of 397.9 kA/m (5 kOe), the squareness (Br/Bm) thereof is preferably not less than 0.855; the orientation property (OR) thereof is preferably not less than 3.2; the coercive force distribution (Switching Field Distribution: SFD) thereof is preferably not more than 0.50. The magnetic coating film produced using the magnetic metal primary particles of the present invention has an oxidation stability ($\Delta Bm$) of preferably not more than 4.0% when magnetically oriented in a magnetic field of 397.9 kA/m (5 kOe).

Next, the process for producing the secondary agglomerates of magnetic metal particles according to the present invention is described.

The secondary agglomerates of magnetic metal particles according to the present invention are produced by granulating goethite particles or hematite particles obtained by heat-treating the goethite particles, into desired size; reducing the obtained granulated product of the goethite particles or hematite particles to form a granulated product of magnetic metal particles; deaggregating the granulated product of magnetic metal particles; and subjecting the deaggregated granulated product of magnetic metal particles to water-washing and then drying.

The goethite particles used as the starting material in the present invention are of an acicular shape, and have an average major axis diameter of usually 0.05 to 0.40 μm, preferably 0.05 to 0.30 μm; an aspect ratio of usually 4:1 to 15:1, preferably 4:1 to 10:1; and a BET specific surface area of usually 70 to 250 $m^2/g$, preferably 100 to 250 $m^2/g$.

Also, the goethite particles used as the starting material in the present invention have a Co content of usually 0.5 to 45 atm %, preferably from 0.5 atm % to less than 5 atm % based on whole Fe; and an Al content of usually 5 to 20 atm %, preferably 5 to 10 atm % based on whole Fe.

The hematite particles used as the starting material in the present invention, may be such hematite particles obtained by subjecting the goethite particles to anti-sintering treatment, and then heat-treating the thus-treated goethite particles at a temperature of usually 400 to 850° C.

As the anti-sintering agent, there may be used rare earth compounds. Examples of the suitable rare earth compounds may include compounds containing at least one element selected from the group consisting of scandium, yttrium, lanthanum, cerium, praseodymium, neodymium and samarium. The rare earth compounds may be used especially in the form of chlorides, sulfates, nitrates or the like. The anti-sintering treatment may be conducted by either wet- or dry-coating method. Of these methods, the wet-coating method is more preferred.

The rare earth compound may be used in an amount of usually 1 to 15 atm %, preferably 1.5 to 5 atm % based on whole Fe.

After the heat-treatment, the obtained hematite particles may be rinsed in order to remove impurity salts such as $Na_2SO_4$ therefrom. In this case, the rinsing is preferably conducted so as to remove only undesired impurity salts without elution of the anti-sintering agent coated. More specifically, the rinsing can be effectively performed under a high pH condition in order to remove cationic impurities, and under a low pH condition in order to remove anionic impurities.

The hematite particles used in the present invention are of an acicular shape, and have an average major axis diameter of usually 0.05 to 0.38 μm, preferably 0.05 to 0.28 μm; an aspect ratio of usually 4:1 to 15:1, preferably 4:1 to 10:1; and a BET specific surface area of usually 30 to 150 $m^2/g$. Also, the hematite particles have a Co content of usually 0.5 to 45 atm %, preferably from 0.5 atm to less than 5 atm % based on whole Fe; an Al content of usually 5 to 20 atm %, preferably 5 to 10 atm % based on whole Fe; and a rare earth element content of usually 1 to 15 atm %, preferably 1.5 to 5 atm % based on whole Fe.

The granulated product of goethite particles or hematite particles is produced by various granulating methods such as rolling granulation, compression granulation, deaggregating granulation, extrusion granulation or the like. Among these methods, it is preferred from industrial viewpoint that the granulated product of goethite particles or hematite particles is produced by compression-dehydrating a suspension containing goethite or hematite particles coated with an anti-sintering agent using a filter press, and then extrusion-granulating the obtained filter cake.

The granulated product of goethite particles or hematite particles used as a starting material in the present invention is of a cylindrical shape having an average granulated particle size (average length) of usually 1 to 10 mm and an average diameter of usually 2 to 5 mm, and have a bulk density of usually not less than 0.25 g/ml, preferably not less than 0.3 g/ml, more preferably not less than 0.4 g/ml.

When the average granulated particle size of the granulated product of the starting material is less than 1 mm, the granulated product is considerably fluidized by a reducing gas flow introduced. As a result, the particles suffer from impingement or collision and frictional contact therebetween, resulting in sintering between the particles and shape destruction of primary particles thereof. Further, the particles tend to be scattered out of the system because of fineness thereof, thereby causing problems such as formation of dusts, clogging of exhaust gas filter or the like. When the average granulated particle size of the granulated product is more than 10 mm, it takes a long time until the reducing gas reaches the inside of each granulated particle, and further the diffusion of water vapor into each granulated particle which determines the reduction reaction velocity, becomes too slow, resulting in prolonged reducing time, low productivity and poor magnetic properties.

When the bulk density of the granulated product is less than 0.25 g/ml, the granulated product tends to have a too low strength, resulting in formation of fine dusts. Further, when the amount of the reducing gas introduced is increased for enhancing the reducing efficiency, the granulated product tends to be fluidized because of lightweight of individual granulated particles. As a result, the granulated product suffers from impingement or collision and frictional contact therebetween, resulting in sintering between the particles and shape destruction of primary particles thereof.

Then, in the present invention, the granulated product of goethite particles or hematite particles is heat-reduced at a temperature of usually 400 to 700° C., thereby obtaining a granulated product of magnetic metal particles. When the heat-reducing temperature is less than 400° C., the reduction reaction proceeds too slowly, resulting in prolonged reaction time. When the heat-reducing temperature is more than 700° C., the reduction reaction tends to proceed too rapidly, resulting in deformation of the particles, or sintering within and between the particles.

In the present invention, after the heat-reduction, the obtained granulated product of magnetic metal particles may be taken out in air by known methods, for example, the method of temporarily replacing the atmosphere for the granulated product of magnetic metal particles obtained by the heat-reduction with an inert gas, and then gradually increasing the oxygen content in the inert gas until finally reaching that of air, or the method of gradually oxidizing the granulated product using a mixed gas of oxygen and water vapor.

The granulated product of magnetic metal particles is of a cylindrical shape having an average granulated particle size (average length) of usually 1 to 5 mm and an average diameter of usually 2 to 3 mm, and has a repose angle of usually 36 to 43°, and a bulk density of usually not less than 0.35 g/ml, preferably not less than 0.50 g/ml.

In the present invention, after the heat-reduction, the obtained granulated product of magnetic metal particles is subjected to deaggregating treatment.

Here, the "deaggregating treatment" used in the present invention means such a treatment of deaggregating the granulated product of magnetic metal particles using an apparatus having a crushing function for crushing the granulated product by a rotor and a sizing function for forcibly passing the crushed particles through a screen. More specifically, the granulated product of magnetic metal particles is crushed by a rotor having twin screws rotated in opposite directions, and then sized or grated by forcibly passing the crushed particles through a screen having a mesh size of usually 1.0 to 2.0 mm. As the apparatus for the deaggregating treatment, there may be used RUNDEL MILL RMI Model (manufactured by Tokuju Kosakusho Co., Ltd.), a combined granulator (manufactured by Turbo Kogyo Co., Ltd.), or the like. The apparatus is preferably operated at a rotor-rotating speed of usually 100 to 400 rpm while charging thereinto the material to be treated in an amount of usually 1 to 10 kg/minute.

Meanwhile, as the screen of the apparatus, there may be used either a punching-type screen obtained by punching a metal plate, or a mesh-type screen obtained by weaving wires.

As to magnetic properties of the granulated product of magnetic metal particles, the coercive force thereof is usually 103.5 to 206.9 kA/m (1,300 to 2,600 Oe), preferably 111.4 to 143.2 kA/m (1,400 to 1,800 Oe); and the saturation magnetization thereof is usually 110 to 160 $Am^2$/kg (110 to 160 emu/g), preferably 120 to 140 $Am^2$/kg (120 to 140 emu/g).

In the present invention, the secondary agglomerates of magnetic metal particles obtained by the deaggregating treatment are washed with water to reduce the soluble salt content in the magnetic metal particles. Even though the granulated product of magnetic metal particles are washed with water, it may be difficult to sufficiently reduce the soluble salt content therein because of low water-washing efficiency. Further, the low water-washing efficiency requires a too long washing time until sufficiently reducing the soluble salt content, so that there tends to arise deterioration in saturation magnetization thereof. Also, in the case where a water suspension containing magnetic metal primary particles obtained by pulverizing the granulated product of magnetic metal particles, is washed with water, the distance between the individual magnetic metal primary particles becomes too small upon drying because of high surface tension of water, resulting in poor dispersibility in a coating film and deteriorated magnetic properties thereof.

The water-washing treatment may be conducted by an ordinary method so as not to break a configuration of the granulated product. For example, the secondary agglomerates of magnetic metal particles obtained by the deaggregating treatment may be water-washed by passing therethrough ion-exchanged water in a desired amount so that the electric conductivity of the resultant filtrate becomes not more than 10 $\mu$S/cm. The higher the temperature of the ion-exchanged water passed, the higher the water-washing efficiency. However, when the temperature is too high, the obtained secondary agglomerates tend to be deteriorated in saturation magnetization. Therefore, the temperature of the ion-exchanged water passed is preferably not more than 80° C.

The water-washed secondary agglomerates of magnetic metal particles are dried at a temperature of preferably not more than 80° C. When the drying temperature is more than 80° C., the obtained secondary agglomerates of magnetic metal particles tend to be deteriorated in magnetic properties, especially saturation magnetization. The drying may be preferably conducted in an atmosphere of air and/or nitrogen gas.

By drying the water-washed secondary agglomerates of magnetic metal particles, the water content of the magnetic metal particles may be adjusted to usually 0.5 to 1.5% by weight, preferably 0.8 to 1.5% by weight.

In the present invention, when the granulated product of such magnetic metal particles as produced by the following method (though not particularly restricted thereto) are subjected to the deaggregating treatment and then water-washing treatment, the obtained secondary agglomerates of magnetic metal particles can exhibit a still less soluble salt content, and can maintain good magnetic properties despite a small cobalt content.

That is, the magnetic metal particles of the present invention can be obtained by the first step of producing spindle-shaped goethite particles; the second step of coating the spindle-shaped goethite particles with an anti-sintering agent, or further heat-dehydrating the spindle-shaped goethite particles coated with the anti-sintering agent to produce spindle-shaped hematite particles; and the third step of heat-reducing the spindle-shaped goethite particles coated with the anti-sintering agent or the spindle-shaped hematite particles.

Next, the process for producing the spindle-shaped goethite particles as the first step is described.

The spindle-shaped goethite particles are produced by first forming spindle-shaped goethite seed crystal particles and then growing a goethite layer on the surface of respective goethite seed crystal particles.

The spindle-shaped goethite seed crystal particles are obtained as follows. That is, upon producing the spindle-shaped goethite seed crystal particles by reacting an aqueous ferrous salt solution with a mixed aqueous alkali solution of an aqueous alkali carbonate solution and an aqueous alkali hydroxide solution; aging the resultant water suspension containing a ferrous-containing precipitate in a non-oxidative atmosphere; and then passing an oxygen-containing gas through the water suspension to conduct an oxidation reaction thereof, a Co compound is added in an amount of usually from 0.5 to 45 atm % (calculated as Co) based on whole Fe, to the water suspension containing the ferrous-containing precipitate during aging of the water suspension but prior to the elapse of usually 20% of the whole aging time before initiation of the oxidation reaction, and then the oxidation reaction for producing the spindle-shaped goethite seed crystal particles is conducted such that usually 30 to 50% of whole $Fe^{2+}$ is oxidized.

When the Co compound is added after the elapse of 20% of the whole aging time, it may be difficult to obtain goethite particles having the aimed particle size and aspect ratio. When the oxidation reaction is conducted such that less than 30% or more than 50% of the whole $Fe^{2+}$ is oxidized, it may also be difficult to obtain goethite particles having the aimed particle size and aspect ratio.

The aging of the water suspension is conducted at a temperature of usually 40 to 80° C. in a non-oxidative atmosphere. When the aging temperature is less than 40° C., it may be difficult to attain a sufficient aging effect because of too small aspect ratio. When the aging temperature is more than 80° C., the obtained particles may contain magnetite particles as impurities. The aging time is usually 30 to 300 minutes. When the aging time is less than 30 minutes or more than 300 minutes, it may be difficult to obtain goethite particles having the aimed aspect ratio. In order to produce the non-oxidative atmosphere, an inert gas such as nitrogen gas or a reducing gas such as hydrogen, may be passed though a reactor.

As the aqueous ferrous salt solution used in the production reaction of the spindle-shaped goethite seed crystal particles, there may be used an aqueous ferrous sulfate solution, an aqueous ferrous chloride solution or the like. These solutions may be used singly or in the form of a mixture of any two or more thereof.

The mixed aqueous alkali solution used in the production reaction of the spindle-shaped goethite seed crystal particles may be obtained by mixing an aqueous alkali carbonate solution with an aqueous alkali hydroxide solution. The mixing percentage of these aqueous solutions (% calculated as normality) is adjusted such that the concentration of the aqueous alkali hydroxide solution is preferably 10 to 40%, more preferably 15 to 35% (calculated as normality). When the concentration of the aqueous alkali hydroxide solution is less than 10%, it may be difficult to obtain goethite particles having the aimed aspect ratio. When the concentration of the aqueous alkali hydroxide solution is more than 40%, the obtained particles may contain granular magnetite particles as impurities.

As the aqueous alkali carbonate solution, there may be used an aqueous sodium carbonate solution, an aqueous potassium carbonate solution, an aqueous ammonium carbonate solution or the like. As the aqueous alkali hydroxide solution, there may be used an aqueous sodium hydroxide solution, an aqueous potassium hydroxide solution or the like. These solutions may be respectively used singly or in the form of a mixture of any two or more thereof.

The amount of the mixed aqueous alkali solution used is usually 1.3 to 3.5, preferably 1.5 to 2.5 when expressed by the equivalent ratio of alkali contained therein to whole Fe contained in the aqueous ferrous salt solution. When the amount of the mixed aqueous alkali solution used is less than 1.3, the obtained particles may contain magnetite particles as impurities. When the amount of the mixed aqueous alkali solution used is more than 3.5, such a process may be industrially disadvantageous.

The ferrous ion concentration of the solution obtained by mixing the aqueous ferrous salt solution with the mixed aqueous alkali solution is preferably 0.1 to 1.0 mol/liter, more preferably 0.2 to 0.8 mol/liter. When the ferrous ion concentration is less than 0.1 mol/liter, the yield of the aimed particles may become too small, resulting in industrially disadvantageous process. When the ferrous ion concentration is more than 1.0 mol/liter, the obtained particles may have a too broad particle size distribution.

The pH value of the solution used in the production reaction of the spindle-shaped goethite seed crystal particles is preferably 8.0 to 11.5, more preferably 8.5 to 11.0. When the pH value is less than 8.0, the obtained goethite particles may contain acid radicals in such a large amount as not to be readily removed by simple washing treatment, so that the magnetic metal particles produced therefrom may suffer from sintering therebetween. When the pH value is more than 11.5, it may be difficult to obtain particles having the aimed coercive force.

The spindle-shaped goethite seed crystal particles are produced by the oxidation reaction, i.e., by passing an oxygen-containing gas such as air through the solution.

The superficial velocity of the oxygen-containing gas is preferably 2.3 to 3.5 cm/s. When the superficial velocity of the oxygen-containing gas is less than 2.3 cm/s, the oxidation velocity becomes too slow, so that the obtained particles may contain granular magnetite particles as impurities, and it may be difficult to control the particle size thereof to the aimed value. When the superficial velocity of the oxygen-containing gas is more than 3.5 cm/s, the oxidation velocity becomes too high, so that it may also be difficult to control the particle size thereof to the aimed value. Meanwhile, the "superficial velocity" means an amount of the oxygen-containing gas passed per unit sectional area (bottom sectional area of a cylindrical reactor where the pore diameter and pore number of a perforated plate are ignored) (unit: cm/sec).

The production reaction of the spindle-shaped goethite seed crystal particles may be conducted at a temperature capable of forming goethite particles, i.e., usually not more than 80° C., preferably 45 to 55° C. When the production reaction temperature is more than 80° C., the obtained spindle-shaped goethite particles may contain magnetite particles as impurities.

As the Co compound added in the production reaction of the spindle-shaped goethite seed crystal particles, there may be used cobalt sulfate, cobalt chloride, cobalt nitrate or the like. These Co compounds may be used singly or in the form of a mixture of any two or more thereof. The Co compound is added to the water suspension containing the ferrous-containing precipitate during the aging before initiation of the oxidation reaction.

The amount of the Co compound added is usually 0.5 to 45 atm %, preferably from 0.5 to less than 5 atm % based on whole Fe contained in the spindle-shaped goethite particles as the final product.

The pH value of the water suspension used in the growth reaction of the goethite layer is preferably 8.0 to 11.5, more preferably 8.5 to 11.0. When the pH value is less than 8.0, the obtained goethite particles may contain acid radicals in such a large amount as not to be readily removed by simple washing treatment, so that the magnetic metal particles produced therefrom may suffer from sintering therebetween. When the pH value is more than 11.5, it may be difficult to obtain particles having the aimed particle size distribution.

The growth reaction of the goethite layer is conducted by the oxidation reaction, i.e., by passing an oxygen-containing gas such as air though the water suspension. The superficial velocity of the oxygen-containing gas used in the growth reaction of the goethite layer is preferably larger than that used in the production reaction of the seed crystal particles. When the superficial velocity of the oxygen-containing gas used in the growth reaction of the goethite layer is not larger than that used in the production reaction of the seed crystal particles, the viscosity of the water suspension is increased upon the addition of Al, and the crystal growth in the minor axis direction is promoted more remarkably, thereby lowering the aspect ratio. As a result, it may be difficult to obtain particles having the aimed aspect ratio. However, when the superficial velocity of the oxygen-containing gas used in production reaction of the seed crystal particles is not less than 2.0 cm/s, the superficial velocity of the oxygen-containing gas used in the growth reaction of the goethite layer is not necessarily required to be larger than that used in production reaction of the seed crystal particles.

The growth reaction of the goethite layer may be sufficiently conducted at a temperature capable of forming goethite particles, i.e., usually not more than 80° C., preferably 45 to 55° C. When the growth reaction temperature is more than 80° C., the obtained particles may contain magnetite particles as impurities.

As the Al compound added in the growth reaction of the goethite layer, there may be used acid salts such as aluminum sulfate, aluminum chloride and aluminum nitrate; and aluminates such as sodium aluminate, potassium aluminate and ammonium aluminate. These Al compounds may be used singly or in the form of a mixture of any two or more thereof.

In the growth reaction of the goethite layer, the addition of the Al compound is preferably conducted under such a condition that the superficial velocity of the oxygen-containing gas used thereupon is larger than that used in the production reaction of the seed crystal particles. When the addition of the Al compound requires a long period of time, the oxygen-containing gas may be replaced with a nitrogen-containing gas so as not to accelerate the oxidation reaction. When the Al compound is added devidedly, continuously or intermittently under such a condition that the superficial velocity of the oxygen-containing gas used thereupon is smaller than that used in the production reaction of the seed crystal particles, it may be difficult to sufficiently attain the effects of the present invention.

The amount of the Al compound added is usually 5 to 20 atm %, preferably 5 to 10 atm % based on whole Fe contained in the spindle-shaped goethite particles as final product.

The obtained spindle-shaped goethite particles contain Co in an amount of usually 0.5 to 45 atm %, preferably from 0.5 to less than 5 atm % based on whole Fe, and Al in an amount of usually 5 to 20 atm %, preferably 5 to 10 atm % based on whole Fe. The spindle-shaped goethite particles are of a spindle shape, and have an average major axis diameter of more preferably 0.05 to 0.18 μm; a size distribution of more preferably not more than 0.20; an aspect ratio of more preferably 4:1 to 8:1; a BET specific surface area of more preferably 100 to 160 m$^2$/g; a crystallite size $D_{020}$ of preferably 100 to 200 Å; a crystallite size $D_{110}$ of preferably 90 to 130 Å; and a crystallite size ratio $D_{020}/D_{110}$ of preferably less than 1.8.

The spindle-shaped goethite particles are each constituted by a seed crystal portion and a surface layer portion. Cobalt is present in both the seed crystal and surface layer portions, while Al is present only in the surface layer portion.

Here, the "seed crystal portion" means a goethite seed crystal particle produced by oxidizing a part of the ferrous salt added, prior to the addition of the Al compound. More specifically, the seed crystal portion is a portion having a specific weight percentage of Fe determined by the oxidation percentage of $Fe^{2+}$, preferably a portion extending outwardly from the center of each goethite particle and corresponding to usually 30 to 50% by weight of the goethite particle.

Next, the process for producing the spindle-shaped goethite particles and spindle-shaped hematite particles as the second step is described.

In the present invention, the surface of the spindle-shaped goethite particles is treated with the anti-sintering agent in advance of the heat-dehydration treatment, thereby obtaining spindle-shaped goethite particles coated with the anti-sintering agent. Further, the obtained coated spindle-shaped goethite particles are heat-dehydrated at a temperature of usually 650 to 800° C. in a non-reducing atmosphere, thereby obtaining spindle-shaped hematite particles.

By preliminarily coating the surface of the respective goethite particle with the anti-sintering agent, it becomes possible not only to inhibit the sintering within respective particles and sintering between the particles, but also to obtain spindle-shape hematite particles more accurately maintaining the particle shape and aspect ratio of the starting spindle-shaped goethite particles, thereby ensuring the production of independent spindle-shaped magnetic metal particles containing iron as a main component, which can also retain the shape and aspect ratio of the starting spindle-shaped goethite particles.

When the spindle-shaped goethite particles surface-coated with the anti-sintering agent may be heat-treated at a temperature of usually 650 to 800° C. in a non-reducing atmosphere, the heat-treatment is preferably conducted such that the ratio of crystallite size $D_{104}$ of the obtained spindle-shaped hematite particles to crystallite size $D_{110}$ of the starting spindle-shaped goethite particles [(crystallite size ratio of $D_{104}$(hematite)/$D_{110}$(goethite))] is within the range of preferably 1.0 to 1.3.

When the heat-treating temperature is less than 650° C., the ratio of $D_{104}$(hematite)/$D_{110}$(goethite) tends to be less than 1.0. Whereas, when the heat-treating temperature is more than 800° C., the ratio of $D_{104}$(hematite)/$D_{110}$(goethite) tends to be more than 1.3. When the ratio of $D_{104}$(hematite)/$D_{110}$(goethite) is less than 1.0, the magnetic metal particles produced using such particles exhibit broader particle size distribution, and the coating film obtained therefrom tends to be deteriorated in SFD. On the other hand, when the ratio of $D_{104}$(hematite)/$D_{110}$(goethite) is more than 1.3, the obtained hematite particles tend to suffer from shape destruction and sintering, so that the magnetic metal particles produced from such hematite particles tend to similarly exhibit broader particle size distribution and suffer from sintering. Further, the magnetic coating film produced using such magnetic metal particles tends to be deteriorated in squareness and SFD.

The thus obtained spindle-shaped hematite particles have a Co content of usually 0.5 to 45 atm %, preferably from 0.5 to less than 5 atm % based on whole Fe; an Al content of usually 5 to 20 atm %, preferably 5 to 10 atm % based on whole Fe; and a rare earth element content of usually 1 to 15 atm %, preferably 1.5 to 5 atm % based on whole Fe. The reasons for defining the Co and Al contents are the same as those for defining the composition of the goethite particles. When the rare earth element content is less than 1 atm %, it may be difficult to attain a sufficient anti-sintering effect. In addition, the magnetic metal particles produced using such hematite particles tend to be deteriorated in size distribution, and the magnetic coating film produced using such magnetic metal particles tend to be deteriorated in SFD. When the rare earth element content is more than 15 atm %, the saturation magnetization of the obtained particles tend to be reduced.

The spindle-shaped hematite particles of the present invention are of a spindle-shape, and have an average major axis diameter of more preferably 0.05 to 0.17 μm; a size distribution of more preferably not more than 0.22; an aspect ratio of more preferably 4:1 to 9:1; a BET specific surface area of more preferably from 35 to less than 60 m²/g; a crystallite size ratio $D_{104}$ of preferably 120 to 160 Å; a crystallite size ratio $D_{110}$ of preferably 200 to 300 Å; and a crystallite size ratio $D_{110}/D_{104}$ of preferably 1.8 to 2.2.

The spindle-shaped hematite particles of the present invention are each constituted by a seed crystal portion, an intermediate layer portion and an outer surface layer portion. Cobalt is contained in both the seed crystal and intermediate layer portions, while aluminum is contained only in the intermediate layer portion and the rare earth element is contained only in the outer surface layer portion.

Here, the "seed crystal portion" of each hematite particle is the same as the seed crystal portion of the above goethite particle. The seed crystal portion is preferably a portion extending outwardly from the center of each hematite particle which corresponds to the portion containing Fe in an amount of 30 to 50% by weight based on whole Fe contained in each hematite particle. The intermediate layer portion of each hematite particle is the same as the surface layer portion of the above goethite particle. The intermediate layer portion is preferably a portion extending outwardly from the outer surface of the seed crystal portion up to the inner surface of the rare earth-containing outer surface layer, which corresponds to a portion containing Fe in an amount of usually 50 to 70% by weight based on whole Fe contained in each hematite particle.

In the third step of the process of the present invention, the spindle-shaped goethite particles or the spindle-shaped hematite particles are charged into a reducing apparatus so as to form a fixed bed therein, and heat-reduced at a temperature of usually 400 to 700° C., thereby obtaining spindle-shaped magnetic metal particles containing iron as a main component.

In the process of the present invention, when forming the fixed bed in the reducing apparatus, the spindle-shaped goethite particles or the spindle-shaped hematite particles are granulated by the above-mentioned method so as to form a granulated product of the spindle-shaped goethite particles or spindle-shaped hematite particles having an average granulated particle diameter of 1 to 5 mm.

In the present invention, as the reducing apparatus in which the spindle-shaped goethite particles or the spindle-shaped hematite particles form a fixed bed, there may be preferably used a movable-type (continuous-type) reducing apparatus in which the fixed bed is formed on a movable belt or tray, and reduced while moving the belt or tray.

The fixed bed formed by the granulated product of the spindle-shaped goethite particles or the spindle-shaped hematite particles has a height of preferably 3 to 15 cm, more preferably 4 to 14 cm. When the height of the fixed bed is more than 15 cm, the particles located at a lower portion of the fixed bed tend to be reduced too rapidly, thereby causing the increase in water vapor partial pressure. As a result, there tends to be caused such a problem that the particles located at an upper portion of the fixed bed are deteriorated in coercive force, resulting in deterioration in properties as a whole. When the height of the fixed bed is less than 3 cm, the granulated product of the spindle-shaped goethite particles or the spindle-shaped hematite particles tend to be scattered around though the degree of scattering depends upon the superficial velocity of the reducing gas introduced.

In the process of the present invention, the atmosphere used during heating up to a reducing temperature of 400 to 700° C. is a reducing gas atmosphere. As the reducing gas, there may be suitably used a hydrogen gas. If an atmosphere other than the reducing gas atmosphere, in particular, an inert gas atmosphere, is used during the temperature-rise step, the subsequent reduction reaction proceeds too rapidly when the inert gas is switched to the reducing gas upon the reduction step, thereby inhibiting a uniform particle growth and, therefore, failing to attain a high coercive force.

In the process of the present invention, the reducing gas used in the temperature-rise step is fed at a superficial velocity of usually 40 to 150 cm/s, preferably 40 to 140 cm/s. When the superficial velocity of the reducing gas is less than 40 cm/s, since water vapor generated by the reduction of the spindle-shaped goethite particles or the spindle-shaped hematite particles is very slowly discharged out of the reaction system, the particles obtained at an upper portion of the fixed bed tend to be deteriorated in coercive force, and the coating film produced therefrom tends to show a poor SFD, thereby failing to attain a high coercive force as a whole. When the superficial velocity of the reducing gas is more than 150 cm/s, although the aimed spindle-shaped magnetic metal particles are obtained, there arise problems such as need of too high reducing temperature and destruction of the granulated product due to scattering.

The temperature rise rate used upon heating the fixed bed in the process of the present invention, is usually 10 to 80°

C./minute, preferably 20 to 70° C./minute. When the temperature rise rate is less than 10° C./minute, the reduction reaction tends to proceed very slowly from the lower portion of the fixed bed in low-temperature range, so that the obtained magnetic metal particles tend to have a very small crystallite size. In addition, since water vapor generated upon the reduction is very slowly discharged out of the reaction system, the particles obtained at the upper portion of the fixed bed tend to be deteriorated in coercive force, the coating film produced therefrom tends to show a poor SFD, and further the particles obtained at the lower portion of the fixed bed tend to be deteriorated in crystallinity, thereby failing to attain a high coercive force as a whole. When the temperature rise rate is more than 80° C./minute, such a heating condition tends to be analogous to the attitude of heating in a nitrogen atmosphere, thereby causing rapid reduction reaction and transfer to α-Fe under relatively high water vapor partial pressure. As a result, the obtained magnetic metal particles tend to have a large crystallite size and a low coercive force, and the coating film produced therefrom tends to be deteriorated in SFD.

The atmosphere used upon the heat-reduction in the process of the present invention, is a reducing gas atmosphere. As the reducing gas, there may be suitably used a hydrogen gas.

The heat-reduction may be conducted at a temperature of usually 400 to 700° C. When the heat-reducing temperature is less than 400° C., the heat-reduction reaction tends to proceed very slowly, resulting in prolonged reaction time. When the heat-reducing temperature is more than 700° C., the heat-reduction reaction tends to proceed too rapidly, thereby causing deformation of particles and sintering within and between particles.

The spindle-shaped magnetic metal particles containing iron as a main component, which are obtained after the heat-reduction, may be successively subjected to surface-oxidation, deaggregation and then water-washing, as described above.

The point of the present invention is that when secondary agglomerates obtained by deaggregating (crushing) a granulated product of magnetic metal particles are washed with water, it becomes possible to extremely reduce the amount of soluble salts contained therein, and obtain secondary agglomerates of magnetic metal particles having an excellent dispersibility.

In the present invention, the granulated product of magnetic metal particles are first deaggregated (crushed) to form secondary agglomerates having a specific particle size distribution and then the obtained secondary agglomerates are washed with water. Therefore, the water-washing can be efficiently carried out, thereby more effectively reducing the soluble salt content in the magnetic metal particles. As a result, the magnetic metal particles can be inhibited from being deteriorated in magnetic properties, in particular, saturation magnetization.

In addition, since the magnetic metal particles in the form of secondary agglomerates are washed with water, the primary particles thereof can be prevented from undergoing reduction in distance therebetween due to a large surface tension of water upon drying after the water-washing. Therefore, the obtained magnetic metal particles can be enhanced in not only durability (such as $\Delta\sigma s$ and ignition temperature), but also dispersibility in binder resin and organic solvent upon kneading. As a result, the magnetic coating film produced from such particles can also be enhanced in surface smoothness and squareness.

Since the secondary agglomerates of magnetic metal particles according to the present invention can exhibit an excellent dispersibility and a less soluble salt content while maintaining good magnetic properties, the magnetic coating film produced therefrom can be enhanced in surface smoothness and squareness. Further, the secondary agglomerates of the present invention can be suitably used for the production of coating-type magnetic recording media having a high reliability and an excellent durability.

EXAMPLES

The present invention is described in more detail by Examples and Comparative Examples, but the Examples are only illustrative and, therefore, not intended to limit the scope of the present invention thereto.

Various properties were measured by the following methods.

(1) The average major axial diameter, average minor axial diameter and aspect ratio of particles are respectively expressed by averages of values measured by an electron microscope. The size distribution of the particles is expressed by the value obtained by dividing the standard deviation measured simultaneously with the above values, by the average major axial diameter.

(2) The Co, Al, rare earth contents, Na and Ca were measured using an inductively coupled high-frequency plasma atomic emission spectroscope (SPS-4000 Model, manufactured by Seiko Denshi Kogyo Co., Ltd.).

(3) The specific surface area of particles is expressed by the value measured by BET method using "Monosorb MS-11" (manufactured by Cantachrom Co., Ltd.).

(4) The crystallite size of respective particles is expressed by the thickness of the crystallite in the direction perpendicular to each crystal plane of the respective particles measured by X-ray diffraction method. The value was calculated based on the X-ray diffraction peak curve of each crystal plane using the following Scherrer's formula:

$$\text{Crystallite size} = K\lambda/\beta \cos\theta$$

wherein $\beta$ is a true half-width of the diffraction peak which was corrected with respect to the width of machine used (unit: radian); K is a Scherrer constant (=0.9); $\lambda$ is a wavelength of X-ray used (Cu Kα-ray 0.1542 nm); and $\theta$ is a diffraction angle (corresponding to a diffraction peak of each crystal plane).

(5) The magnetic properties of magnetic metal particles and magnetic coating film were measured using a vibration sample magnetometer "VSM-3S-15" (manufactured by Toei Kogyo Co., Ltd.) by applying an external magnetic field of 795.8 kA/m (10 kOe) thereto.

(6) The oxidation stability ($\Delta\sigma s$) of the saturation magnetization ($\sigma s$) of particles, and the oxidation stability ($\Delta Bm$) of saturation magnetic flux density (Bm) of the magnetic coating film were measured as follows.

The particles and the magnetic coating film were placed in a constant-temperature oven maintained at 60° C. and a relative humidity of 90%, and allowed to stand therein for one week to conduct an accelerated deterioration test. Thereafter, the particles and the magnetic coating film were measured to determine the saturation magnetization value and saturation magnetic flux density, respectively. The oxidation stability values $\Delta\sigma s$ and $\Delta Bm$ were calculated by dividing the difference (absolute value) between the values $\sigma s$ and $\sigma s'$ measured before and after the one-week accelerated test, and the difference (absolute value) between the values Bm and Bm' measured before and after the one-week accelerated test, by the values $\sigma s$ and Bm measured before the accelerated test, respectively.

(7) The ignition temperature of magnetic metal particles was measured using TG/DTA measuring device "SSC5100TG/DTA22" (manufactured by Seiko Denshi Kogyo Co., Ltd.).

(8) The water content of the spindle-shaped magnetic metal particles was measured using a Karl Fischer moisture meter (manufactured by Kyoto Denshi Co., Ltd.).

(9) The average particle diameter, repose angle and bulk density of secondary agglomerates were measured using a powder tester "PT-N-Model" manufactured by Hosokawa Micron Co., Ltd.

Meanwhile, the magnetic coating film was prepared as follows.

The respective components shown below were charged into a 100-ml glass bottle, and then mixed and dispersed for 8 hours using a paint shaker (manufactured by Reddevil Co., Ltd.), thereby preparing a magnetic coating composition. The thus prepared magnetic coating composition was coated on a 25 μm-thick polyethylene telephthalate film using an applicator to form a 50 μm-thick coating layer. Then, the obtained film was dried in a magnetic field of 397.9 kA/m (5 kOe), thereby obtaining a magnetic coating film. The thus obtained magnetic coating film was measured to determine magnetic properties thereof.

| Coating composition | |
| --- | --- |
| 3 mmφ steel balls | 800 parts by weight |
| Spindle-shaped magnetic metal particles containing iron as a main component | 100 parts by weight |
| Polyurethane resin having a sodium sulfonate group | 20 parts by weight |
| Cyclohexanone | 83.3 parts by weight |
| Methyl ethyl ketone | 83.3 parts by weight |
| Toluene | 83.3 parts by weight |

Example 1

First Step: Production of Spindle-shaped Goethite Particles 30 liters of a mixed aqueous alkali solution containing sodium carbonate of 25 mol and an aqueous sodium hydroxide solution of 19 mol (the concentration of sodium hydroxide is equivalent to 27.5 mol % (calculated as normality) based on mixed alkali), was charged into a bubble tower and heated to 47° C. while passing therethrough a nitrogen gas at a superficial velocity of 2.20 cm/s. Then, 20 liters of an aqueous ferrous sulfate solution containing 20 mol of $Fe^{2+}$ (the concentration of the mixed aqueous alkali solution is 1.725 equivalents (calculated as normality) based on ferrous sulfate) was charged into the bubble tower, and were therein for 45 minutes. Thereafter, 4 liters of an aqueous cobalt sulfate solution containing 0.96 mol of $Co^{2+}$ (corresponding to 4.8 atm % (calculated as Co) based on whole Fe) was added to the bubble tower and were further aged for 4 hours and 15 minutes (percentage of time required for Co addition based on whole aging time: 15%). After aging, air was passed through the bubble tower at a superficial velocity of 2.50 cm/s to conduct the oxidation reaction until the oxidation percentage of $Fe^{2+}$ reached 40%, thereby producing goethite seed crystal particles.

Then, an aqueous aluminum sulfate solution containing 1.6 mol of $Al^{3+}$ (corresponding to 8.0 atm % (calculated as Al) based on whole Fe) was added at a rate of not more than 3 ml/sec to conduct the oxidation reaction, and the reaction mixture was washed with water using a filter press until the electric conductivity of the resultant filtrate reached 60 μS/cm, thereby obtaining a press cake.

A part of the obtained press cake was dried and pulverized by ordinary methods, thereby obtaining spindle-shaped goethite particles. It was confirmed that the obtained goethite particles were of a spindle shape, and had an average major axis diameter of 0.159 μm, a standard deviation σ of 0.0306 μm, a size distribution (standard deviation/major axis diameter) of 0.192, an average minor axis diameter of 0.02481 μm, an aspect ratio of 6.4:1, and a BET specific surface area of 153.8 m²/g. Further, it was confirmed that the obtained goethite particles contained no dendritic particles, and had a crystallite size $D_{020}$ of 195 Å, a crystallite size $D_{110}$ of 110 Å, a ratio $D_{020}/D_{110}$ of 1.77, a Co content of 4.8 atm % based on whole Fe and an Al content of 8.0 atm % based on whole Fe, and that aluminum was contained only in a surface portion of each particle.

Second step: Production of Spindle-shaped Hematite Particles

Then, the press cake containing 1,000 g of the obtained spindle-shaped goethite particles (corresponding to 9.22 mol (calculated as Fe)) was sufficiently dispersed in 40 liters of water. Then, 2 liters of an aqueous neodymium nitrate solution containing 121.2 g of neodymium nitrate hexahydrate (corresponding to 3.0 atm % (calculated as Nd) based on whole Fe contained in the goethite particles) was added to the dispersion, and then stirred. Further, after a 25% by weight aqueous sodium carbonate solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and then dried at 120° C., thereby obtaining a granulated product of the spindle-shaped goethite particles coated with the neodymium compound. It was confirmed that the obtained granulated product was of a cylindrical shape having an average diameter of 3.3 mm and an average length of 10 mm.

The goethite particles obtained by pulverizing the granulated product had a Co content of 4.8 atm % based on whole Fe; an Al content of 8.0 atm % based on whole Fe; and a Nd content of 3.0 atm % based on whole Fe. In addition, it was confirmed that Al was contained only in the intermediate layer portion of each particle, and Nd was contained only in the outer surface layer portion thereof.

The granulated product of the spindle-shaped goethite particles coated with the neodymium compound was heat-dehydrated in air at 760° C. such that the obtained spindle-shaped hematite particles exhibited a ratio $D_{020}$(hematite)/$D_{110}$(goethite) of 1.0 to 1.3, thereby obtaining a granulated product of spindle-shaped hematite particles having an outer surface layer composed of the neodymium compound. The thus obtained granulated product of spindle-shaped hematite particles was of a cylindrical shape having an average diameter of 3.1 mm and an average length of 5 mm.

The spindle-shaped hematite particles constituting the granulated product of spindle-shaped hematite particles were of a spindle shape, and had an average major axis diameter of 0.141 μm, a standard deviation σ of 0.0304 μm, a size distribution (standard deviation/average major axis diameter) of 0.216, an average minor axis diameter of 0.0201, an aspect ratio of 7.0:1 and a BET specific surface area of 38.8 m²/g. In addition, it was confirmed that the Co content of the spindle-shaped hematite particles was 4.8 atm % based on whole Fe; the Al content thereof was 8.0 atm % based on whole Fe; and the Nd content thereof was 3.0 atm % based on whole Fe. Further, it was confirmed that the spindle-shaped hematite particles had a crystallite size $D_{104}$ of 142 Å, a ratio $D_{104}$(hematite)/$D_{110}$(goethite) of 1.29, a crystallite size $D_{110}$ of 275 Å, and a ratio $D_{110}/D_{104}$ of 1.94.

Third Step: Production of Spindle-shaped Magnetic Metal Particles Containing Iron as a Main Component Then, the thus obtained spindle-shaped hematite particles having the outer surface layer composed of the neodymium compound were charged into a reducing apparatus so as to form a fixed bed thereof having a height of 7 cm. The fixed bed of the spindle-shaped hematite particles was heated up to a reducing temperature of 480° C. at a temperature rise rate of 20° C./minute by passing a hydrogen ($H_2$) gas at 480° C. through the reducing apparatus at a superficial velocity of 70 cm/s, and continuously heat-reduced. Then, after the hydrogen gas was replaced with a nitrogen gas, the obtained particles were cooled to 70° C., and then the oxygen partial pressure in the reducing apparatus was gradually increased by passing water vapor therethrough until the oxygen content therein reached the same content as in air, thereby forming a stable oxide film on the surface of the respective particles.

The obtained granulated product of spindle-shaped magnetic metal particles was of a cylindrical shape, and had an average length of 3 mm (maximum length: 5 mm), an average diameter of 2.8 mm, a repose angle of 40° and a bulk density of 0.57 g/ml.

The magnetic metal particles constituting the granulated product of spindle-shaped magnetic metal particles were of a spindle shape, and had an average major axis diameter of 0.126 µm, a standard deviation σ of 0.0290 µm, a size distribution (standard deviation/major axis diameter) of 0.230, an average minor axis diameter of 0.0198 µm, an aspect ratio of 6.4:1, a BET specific surface area of 42.5 $m^2$/g and a crystallite size of 160 Å. Further, the magnetic metal particles were spindle shaped particles having a uniform particle size, and contained a less amount of dendritic particles. In addition, it was confirmed that the magnetic metal particles had a water content of 1.00% by weight; a soluble Na salt content of 83 ppm; a soluble Ca salt content of 44 ppm; a Co content of 4.8 atm % based on whole Fe; an Al content of 8.0 atm % based on whole Fe; and a Nd content of 3.0 atm % based on whole Fe. As to the magnetic properties of the spindle-shaped magnetic metal particles, the coercive force thereof was 133.7 kA/m (1,680 Oe); the saturation magnetization σs thereof was 127.0 $Am^2$/kg (127.0 emu/g); the squareness (σr/σs) thereof was 0.490; the oxidation stability Δσs of saturation magnetization thereof was 4.5% as an absolute value (measured value: −4.5%); and the ignition temperature thereof was 145° C.

As to sheet properties of a coating film produced using the magnetic metal particles, the sheet coercive force Hc was 132.1 kA/m (1,660 Oe); the sheet squareness (Br/Bm) was 0.850; the sheet orientation property OR was 3.10; the sheet SFD was 0.510; and ΔBm was 3.0% as an absolute value (measured value: −3.0%).

Production of Secondary Agglomerates of Magnetic Metal Particles

Then, the obtained cylindrical granulated product of the spindle-shaped magnetic metal particles was charged at a feed rate of 5 kg/minute into a rotor ("RUNDERMILL RM-1 Model" manufactured by Tokuju Kosakusho Co., Ltd.) equipped with twin screws rotated in opposite directions at a rotating speed of 300 rpm, and then deaggregated by passing through a punching-type screen having a mesh size of 1.5 mm and being disposed underneath the rotor, thereby obtaining secondary agglomerates of spindle-shaped magnetic metal particles. The thus obtained secondary agglomerates of spindle-shaped magnetic metal particles had an average particle diameter of 650 µm (maximum particle diameter: 1,500 µm), and a weight percentage of agglomerates with a particle diameter of not more than 53 µm, of 2.5%, a repose angle of 410, and a bulk density of 0.58 g/ml.

Then, 50 parts by weight of ion-exchanged water was passed through one part by weight of the secondary agglomerates of spindle-shaped magnetic metal particles so as not to cause shape destruction of the agglomerates, whereby the secondary agglomerates were washed with water until the electric conductivity of the resultant filtrate reached 10 µS/cm. Thereafter, the secondary agglomerates of spindle-shaped magnetic metal particles were allowed to stand in a ventilation dryer at 60 for 12 hours, thereby drying the secondary agglomerates until the water content thereof was reduced to 0.5 to 1.5%.

The thus dried secondary agglomerates of spindle-shaped magnetic metal particles had an average particle diameter of 640 µm (maximum particle diameter: 1,400 µm), and a weight percentage of agglomerates with a particle diameter of not more than 53 µm, of 3.5%, a repose angle of 42°, and a bulk density of 0.80 g/ml.

The magnetic metal particles constituting the secondary agglomerates of spindle-shaped magnetic metal particles were of a spindle shape, and had an average major axis diameter of 0.125 µm, a standard deviation a of 0.0288 µm, a size distribution (standard deviation/major axis diameter) of 0.230, an average minor axis diameter of 0.0195 µm, an aspect ratio of 6.4:1, a BET specific surface area of 41.4 $m^2$/g and a crystallite size of 159 Å. Further, the magnetic metal particles constituting the secondary agglomerates were spindle shaped particles having a uniform particle size, and contained a less amount of dendritic particles. In addition, it was confirmed that the magnetic metal particles had a water content of 1.05% by weight; a soluble Na salt content of 5 ppm; a soluble Ca salt content of 22 ppm; a Co content of 4.8 atm % based on whole Fe; an Al content of 8.0 atm % based on whole Fe; and a Nd content of 3.0 atm % based on whole Fe. As to the magnetic properties of the spindle-shaped magnetic metal particles, the coercive force thereof was 127.8 kA/m (1,606 Oe); the saturation magnetization value (σS thereof was 125.0 $Am^2$/kg (125.0 emu/g); the squareness (σr/σs) thereof was 0.478; the oxidation stability Δσs of saturation magnetization thereof was 3.8% as an absolute value (measured value: −3.8%); and the ignition temperature thereof was 160° C.

As to sheet properties of a coating film produced using the magnetic metal particles, the sheet coercive force Hc was 133.5 kA/m (1,677 Oe); the sheet squareness (Br/Bm) was 0.862; the sheet orientation property OR was 3.34; the sheet SFD was 0.490; and ΔBm was 2.8% as an absolute value (measured value: −2.8%).

Starting Materials 1 to 3:

Magnetic metal particles as starting materials 1 to 3 were produced by the same method as defined in Example 1 except that the production conditions were changed variously. Meanwhile, the starting material 3 was obtained by directly subjecting goethite particles coated with an anti-sintering agent to reduction and surface oxidation without formation of secondary agglomerates thereof.

Various properties of the obtained starting materials as well as various properties of magnetic coating films produced using the starting materials are shown in Tables 1 to 3.

Examples 2 and 4 and Comparative Examples 1 to 3

The same procedure as defined in Example 1 was conducted using the respective starting materials except that deaggregating and water-washing conditions were changed variously, thereby obtaining secondary agglomerates of magnetic metal particles.

Production conditions and various properties of the obtained secondary agglomerates of magnetic metal particles are shown in Tables 4 and 5. Meanwhile, in Comparative Example 1, the obtained secondary agglomerates were further wet-pulverized using a homomixer, and then washed with water in the form of a water suspension containing the magnetic metal particles. In Comparative Example 2, the granulated product of magnetic metal particles was not deaggregated. In addition, in Comparative Example 3, the granulated product of magnetic metal particles was powdered by applying a linear load thereto, and then washed with water.

Various properties of the magnetic metal particles constituting the secondary agglomerates after drying as well as various properties of magnetic coating films produced using the magnetic metal particles are shown in Tables 6 and 7.

TABLE 1

Various properties of magnetic metal particles containing iron as a main component

| Magnetic metal particles (starting material) | Average major axis diameter (L) ($\mu$m) | Standard deviation ($\sigma$) ($\mu$m) | Size distribution ($\sigma$/L) |
|---|---|---|---|
| Starting material 1 | 0.111 | 0.0239 | 0.215 |
| Starting material 2 | 0.131 | 0.0292 | 0.223 |
| Starting material 3 | 0.085 | 0.0171 | 0.201 |

Various properties of magnetic metal particles containing iron as a main component

| Magnetic metal particles (starting material) | Average minor axis diameter ($\mu$m) | Aspect ratio (–) | BET specific surface area (S) ($m^2$/g) |
|---|---|---|---|
| Starting material 1 | 0.0179 | 6.2:1 | 44.1 |
| Starting material 2 | 0.0182 | 7.2:1 | 41.3 |
| Starting material 3 | 0.0135 | 6.3:1 | 48.7 |

Various properties of magnetic metal particles containing iron as a main component

| Magnetic metal particles starting material) | Crystallite size ($D_{110}$) (Å) | Water content (wt. %) |
|---|---|---|
| Starting material 1 | 157 | 0.91 |
| Starting material 2 | 159 | 1.35 |
| Starting material 3 | 152 | 1.07 |

TABLE 2

Various properties of magnetic metal particles containing iron as a main component

| Magnetic metal particles (starting material) | Soluble Na salt content (ppm) | Soluble Ca salt content (ppm) | Co content (Co/Fe) (atm %) | Al content (Al/Fe) (atm %) |
|---|---|---|---|---|
| Starting material 1 | 98 | 36 | 4.5 | 8.0 |
| Starting material 2 | 110 | 49 | 3.8 | 7.0 |
| Starting material 3 | 73 | 29 | 4.8 | 7.5 |

Various properties of magnetic metal particles containing iron as a main component

| Magnetic metal particles (starting material) | Rare earth element content (Re/Fe) (atm %) | Repose angle (°) | Bulk density (g/ml) |
|---|---|---|---|
| Starting material 1 | 3.5 | 39 | 0.56 |
| Starting material 2 | 2.5 | 41 | 0.56 |
| Starting material 3 | 4.8 | 42 | 0.53 |

TABLE 3

Various properties of magnetic metal particles containing iron as a main component

| Magnetic metal particles (starting material) | Coercive force (Hc) kA/m | Coercive force (Hc) Oe | Saturation magnetization ($\sigma$s) $Am^2$/kg | Saturation magnetization ($\sigma$s) emu/g |
|---|---|---|---|---|
| Starting material 1 | 137.8 | 1,732 | 124.8 | 124.8 |
| Starting material 2 | 128.1 | 1,610 | 125.2 | 125.2 |
| Starting material 3 | 142.2 | 1,787 | 132.6 | 132.6 |

Various properties of magnetic metal particles containing iron as a main component

| Magnetic metal particles (starting material) | Squareness ($\sigma$r/$\sigma$s) | $\Delta\sigma$s (%) | Ignition temperature (° C.) |
|---|---|---|---|
| Starting material 1 | 0.491 | 4.2 | 147 |
| Starting material 2 | 0.489 | 4.4 | 144 |
| Starting material 3 | 0.491 | 4.9 | 141 |

| Magnetic metal particles (starting material) | Properties of magnetic coating film (orientation magnetic field: 5 kOe) Coercive force (Hc) kA/m | Coercive force (Hc) Oe | Squareness (Br/Bm) |
|---|---|---|---|
| Starting material 1 | 136.5 | 1,715 | 0.847 |
| Starting material 2 | 126.4 | 1,589 | 0.851 |
| Starting material 3 | 142.1 | 1,786 | 0.853 |

TABLE 3-continued

| Magnetic metal particles (starting material) | Properties of magnetic coating film (orientation magnetic field: 5 kOe) | | |
|---|---|---|---|
| | Orientation property (OR) | SFD | ΔBm (%) |
| Starting material 1 | 3.06 | 0.517 | 2.8 |
| Starting material 2 | 3.14 | 0.526 | 3.1 |
| Starting material 3 | 3.07 | 0.491 | 3.9 |

TABLE 4

| Examples and Comparative Examples | Magnetic metal particles used (starting material) | Deaggregation treatment Sizing or grating condition | |
|---|---|---|---|
| | | Kind of screen | Mesh size of screen |
| Example 2 | Starting material 1 | Punching-type | 2.0 |
| Example 3 | Starting material 2 | Mesh-type | 1.0 |
| Example 4 | Starting material 3 | Punching-type | 1.5 |
| Comparative Example 1 | Particles obtained in Example 1 | Punching-type | 1.5 |
| Comparative Example 2 | Starting material 2 | — | — |
| Comparative Example 3 | Starting material 3 | Compaction treatment | |

| Examples and Comparative Examples | Various properties of secondary agglomerates of magnetic metal particles | | |
|---|---|---|---|
| | Average particle diameter (μm) | Upper limit of particle diameters (μm) | Weight percentage of agglomerates with a granulated particle diameter of not more than 53 μm (%) |
| Example 2 | 750 | 2,000 | 2.7 |
| Example 3 | 500 | 1,000 | 5.3 |
| Example 4 | 590 | 1,500 | 7.2 |
| Comparative Example 1 | 650 | 1,500 | 2.5 |
| Comparative Example 2 | 3,000 | 5,000 | 0.2 |
| Comparative Example 3 | 50 | 100 | 58.7 |

| Examples and Comparative Examples | Various properties of secondary agglomerates of magnetic metal particles | |
|---|---|---|
| | Repose angle (°) | Bulk density (g/ml) |
| Example 2 | 40 | 0.58 |
| Example 3 | 42 | 0.58 |
| Example 4 | 43 | 0.54 |
| Comparative Example 1 | 41 | 0.58 |
| Comparative Example 2 | 40 | 0.57 |
| Comparative Example 3 | 48 | 0.62 |

TABLE 5

| Examples and Comparative Examples | Water-washing treatment Water-washing condition | |
|---|---|---|
| | Slurry-forming method | Water-washing method |
| Example 2 | None | Water-flowing filtration |
| Example 3 | None | Water-flowing filtration |
| Example 4 | None | Water-flowing filtration |
| Comparative Example 1 | Homomixer | Water-flowing filtration |
| Comparative Example 2 | None | Water-flowing filtration |
| Comparative Example 3 | None | Water-flowing filtration |

| Examples and Comparative Examples | Various properties of secondary agglomerates of magnetic metal particles after drying | | |
|---|---|---|---|
| | Average particle diameter (μm) | Upper limit of particle diameters (μm) | Weight percentage of agglomerates with a granulated particle diameter of not more than 53 μm (%) |
| Example 2 | 730 | 1,880 | 3.0 |
| Example 3 | 480 | 990 | 5.8 |
| Example 4 | 550 | 1,350 | 7.8 |
| Comparative Example 1 | 120 | 240 | 43.4 |
| Comparative Example 2 | 2,900 | 4,880 | 0.3 |
| Comparative Example 3 | 45 | 90 | 63.2 |

| Examples and Comparative Examples | Various properties of secondary agglomerates of magnetic metal particles after drying | |
|---|---|---|
| | Repose angle (°) | Bulk density (g/ml) |
| Example 2 | 41 | 0.78 |
| Example 3 | 43 | 0.79 |
| Example 4 | 43 | 0.75 |
| Comparative Example 1 | 46 | 0.98 |
| Comparative Example 2 | 41 | 0.76 |
| Comparative Example 3 | 49 | 1.01 |

TABLE 6

| Examples and Comparative Examples | Various properties of magnetic metal particles containing iron as a main component after drying | | |
|---|---|---|---|
| | Average major axis diameter (L) (μm) | Standard deviation (σ) (μm) | Size distribution (σ/L) |
| Example 2 | 0.109 | 0.0243 | 0.223 |
| Example 3 | 0.129 | 0.0288 | 0.223 |
| Example 4 | 0.084 | 0.0168 | 0.200 |
| Comparative Example 1 | 0.120 | 0.0299 | 0.249 |
| Comparative Example 2 | 0.129 | 0.0288 | 0.223 |
| Comparative Example 3 | 0.077 | 0.0185 | 0.240 |

TABLE 6-continued

Various properties of magnetic metal particles containing iron as a main component after drying

| Examples and Comparative Examples | Average minor axis diameter ($\mu$m) | Aspect ratio (-) | BET specific surface area (S) ($M^2/g$) |
|---|---|---|---|
| Example 2 | 0.0175 | 6.2:1 | 43.3 |
| Example 3 | 0.0178 | 7.2:1 | 40.9 |
| Example 4 | 0.0133 | 6.3:1 | 47.6 |
| Comparative Example 1 | 0.0195 | 6.2:1 | 41.6 |
| Comparative Example 2 | 0.0178 | 7.2:1 | 41.0 |
| Comparative Example 3 | 0.0133 | 5.8:1 | 49.4 |

Various properties of magnetic metal particles containing iron as a main component after drying

| Examples and Comparative Examples | Crystallite size ($D_{110}$) (Å) | Water content (wt. %) |
|---|---|---|
| Example 2 | 156 | 1.01 |
| Example 3 | 159 | 1.08 |
| Example 4 | 151 | 1.00 |
| Comparative Example 1 | 159 | 1.08 |
| Comparative Example 2 | 160 | 1.01 |
| Comparative Example 3 | 151 | 1.07 |

Various properties of magnetic metal particles containing iron as a main component after drying

| Examples and Comparative Examples | Soluble Na salt content (ppm) | Soluble Ca salt content (ppm) | Co content (Co/Fe) (atm %) |
|---|---|---|---|
| Example 2 | 6 | 18 | 4.5 |
| Example 3 | 7 | 38 | 3.8 |
| Example 4 | 5 | 21 | 4.8 |
| Comparative Example 1 | 9 | 28 | 4.8 |
| Comparative Example 2 | 54 | 45 | 3.8 |
| Comparative Example 3 | 11 | 24 | 4.8 |

Various properties of magnetic metal particles containing iron as a main component after drying

| Examples and Comparative Examples | Al content (Al/Fe) (atm %) | Rare earth element content (Re/Fe) (atm %) |
|---|---|---|
| Example 2 | 8.0 | 3.5 |
| Example 3 | 7.0 | 2.5 |
| Example 4 | 7.5 | 4.8 |
| Comparative Example 1 | 8.0 | 3.0 |
| Comparative Example 2 | 7.0 | 2.5 |
| Comparative Example 3 | 7.5 | 4.8 |

TABLE 7

Various properties of magnetic metal particles containing iron as a main component after drying

| Examples and Comparative Examples | Coercive force (Hc) kA/m | Coercive force (Hc) Oe | Saturation magnetization ($\sigma s$) $Am^2/kg$ | Saturation magnetization ($\sigma s$) emu/g |
|---|---|---|---|---|
| Example 2 | 131.6 | 1,654 | 122.9 | 122.9 |
| Example 3 | 123.4 | 1,551 | 123.1 | 123.1 |
| Example 4 | 134.4 | 1,689 | 129.8 | 129.8 |
| Comparative Example 1 | 124.1 | 1,560 | 121.4 | 121.4 |
| Comparative Example 2 | 124.0 | 1,558 | 123.0 | 123.0 |
| Comparative Example 3 | 126.5 | 1,590 | 122.7 | 122.7 |

Various properties of magnetic metal particles containing iron as a main component after drying

| Examples and Comparative Examples | Reduction in saturation magnetization by treatment (emu/g) | Squareness ($\sigma r/\sigma s$) | $\Delta \sigma s$ (%) | Ignition temperature (°C.) |
|---|---|---|---|---|
| Example 2 | -1.9 | 0.480 | 3.6 | 163 |
| Example 3 | -2.1 | 0.476 | 3.7 | 162 |
| Example 4 | -2.8 | 0.480 | 4.2 | 158 |
| Comparative Example 1 | -5.6 | 0.470 | 3.9 | 148 |
| Comparative Example 2 | -2.2 | 0.475 | 4.2 | 146 |
| Comparative Example 3 | -9.9 | 0.462 | 4.7 | 140 |

Properties of magnetic coating film (orientation magnetic field: 5 kOe)

| Examples and Comparative Examples | Coercive force (Hc) kA/m | Coercive force (Hc) Oe | Squareness (Br/Bm) |
|---|---|---|---|
| Example 2 | 136.9 | 1,720 | 0.858 |
| Example 3 | 126.5 | 1,590 | 0.860 |
| Example 4 | 141.4 | 1,777 | 0.859 |
| Comparative Example 1 | 128.8 | 1,618 | 0.829 |
| Comparative Example 2 | 126.4 | 1,601 | 0.850 |
| Comparative Example 3 | 133.5 | 1,678 | 0.819 |

Properties of magnetic coating film (orientation magnetic field: 5 kOe)

| Examples and Comparative Examples | Orientation property (OR) | SFD | $\Delta Bm$ (%) |
|---|---|---|---|
| Example 2 | 3.22 | 0.491 | 2.5 |
| Example 3 | 3.35 | 0.498 | 2.7 |
| Example 4 | 3.24 | 0.470 | 3.6 |
| Comparative Example 1 | 2.70 | 0.538 | 3.2 |
| Comparative Example 2 | 3.10 | 0.510 | 3.0 |
| Comparative Example 3 | 2.45 | 0.564 | 5.1 |

What is claimed is:

1. Secondary agglomerates of magnetic metal particles for magnetic recording, said secondary agglomerates having a sodium content of not more than 20 ppm, a calcium content of not more than 40 ppm, an average particle diameter of 300 to 800 μm and an upper limit of particle diameters of 2,000 μm, and comprising magnetic metal primary particles containing iron as a main component having an average major axis diameter of 0.05 to 0.25 μm.

2. Secondary agglomerates of magnetic metal particles according to claim 1, wherein an amount of secondary agglomerates having particle diameters of not more than 53 μm is not more than 30% by weight.

3. Secondary agglomerates of magnetic metal particles according to claim 1, which said secondary agglomerates further have a repose angle of repose of 38° to 45° and a water content of 0.5 to 1.5% by weight.

4. Secondary agglomerates of magnetic metal particles according to claim 1, which further have a Co content of 0.5 to 45 atm %, an Al content of 5 to 20 atm %, and a rare earth element content of 1 to 15 atm %.

5. Secondary agglomerates of magnetic metal particles according to claim 1, wherein the magnetic metal primary particles constituting the secondary agglomerates are spindle-shaped magnetic metal particles having an average major axis diameter (L) of 0.05 to 0.15 μm, a coercive force of 111.4 to 143.2 kA/m (1,400 to 1,800 Oe), a Co content of 0.5 to 45 atm % based on whole Fe, a sodium content of not more than 20 ppm, a calcium content of not more than 40 ppm, a crystallite size of from 150 to less than 170 Å, a specific surface area (S) represented by the following formula:

$$S' - 160 \times L + 65,$$

a Δσs value of not more than 5.0%, and an ignition temperature of not less than 150° C.

6. Secondary agglomerates of magnetic metal particles for magnetic recording, said secondary agglomerates having an average particle diameter of 300 to 800 μm and an upper limit of particle diameters of 2,000 μm, wherein an amount of agglomerates having particle diameters of not more than 53 μm is not more than 30% by weight, a repose angle of repose of 38° to 45°, a water content of 0.5 to 1.5% by weight, a Co content of 0.5 to 45 atm %, an Al content of 5 to 20 atm %, and a rare earth element content of usually 1 to 15 atm %, a sodium content of not more than 20 ppm and a calcium content of not more than 40 ppm;

comprising magnetic metal primary particles containing iron as a main component having an average major axis diameter of 0.05 to 0.25 μm.

7. Secondary agglomerates of magnetic metal particles for magnetic recording, having a coercive force of 111.4 to 143.2 kA/m (1,400 to 1,800 Oe), a Co content of from 0.5 to less than 5 atm % based on the total Fe content, a sodium content of not more than 20 ppm, a calcium content of not more than 40 ppm, a Δσs value of not more than 5.0%, and an ignition temperature of not less than 150° C., an average particle diameter of 300 to 800 μm and an upper limit of particle diameter of 2,000 μm; and comprising spindle-shaped magnetic metal particles containing iron as a main component having an average major axis diameter (L) of 0.05 to 0.15 μm, a crystallite size of from 150 to less than 170 Å and a specific surface area (S) represented by the following formula:

$$S - 160 \times L + 65.$$

8. A process for producing secondary agglomerates of magnetic metal particles as defined in claim 1, comprising:

granulating and shaping goethite particles comprising primary particles having an average major axis diameter of 0.05 to 0.40 μm or hematite particles obtained by heat-dehydrating the goethite particles as a starting material;

heat-reducing the resultant granulated product of the goethite or hematite particles to obtain a granulated product of magnetic metal particles;

deaggregating the obtained granulated product of magnetic metal particles using an apparatus having a crushing function for crushing the granulated product of magnetic metal particles by a rotor and a sizing function for forcibly passing the crushed particles through a screen, thereby obtaining crude secondary agglomerates of magnetic metal particles; and subjecting the crude secondary agglomerates to water-washing and then drying.

9. A process for producing secondary agglomerates of magnetic metal particles as defined in claim 1, comprising:

(1) producing spindle-shaped goethite particles by (i) forming spindle-shaped goethite seed crystal particles by (a) reacting an aqueous ferrous salt solution with a mixed aqueous alkali solution of an aqueous alkali carbonate solution and an aqueous alkali hydroxide solution to obtain a water suspension containing a ferrous-containing precipitate, (b) aging the resultant water suspension containing the ferrous-containing precipitate in a non-reducing atmosphere; and then (c) passing an oxygen-containing gas through the water suspension containing the ferrous-containing precipitate to conduct an oxidation reaction thereof; and (ii) growing a goethite layer on surface of the goethite seed crystal particles by passing an oxygen-containing gas through the water suspension containing the goethite seed crystal particles and the ferrous-containing precipitate, wherein a Co compound is added in an amount of 0.5 to 45 atm %, calculated as Co, based on whole Fe, to the water suspension containing the ferrous-containing precipitate during the aging of the water suspension prior to elapse of 20% of whole aging time before initiation of the oxidation reaction, thereby conducting the oxidation reaction such that 30 to 50% of whole $Fe^{2+}$ is oxidized, while passing the oxygen-containing gas through the water suspension at a superficial velocity of 2.3 to 3.5 cm/s; and then after adding an Al compound in an amount of 5 to 20 atm %, calculated as Al, based on whole Fe, to the water suspension, the oxidation reaction is further conducted to produce the spindle-shaped goethite particles;

(2) adding to the water suspension containing the spindle-shaped goethite particles obtained in the step (1), an anti-sintering agent comprising a rare earth compound in an amount of 1 to 15 atm %, calculated as a rare earth element, based on whole Fe, to obtain spindle-shaped goethite particles coated with the rare earth compound, and optionally heat-treating the spindle-shaped goethite particles at a temperature of 650 to 800° C. in a non-reducing atmosphere to obtain spindle-shaped hematite particles;

(3) granulating and shaping the spindle-shaped goethite particles or spindle-shaped hematite particles obtained in the step (2); introducing the granulated product of the spindle-shaped goethite particles or spindle-shaped hematite particles into a reducing apparatus to form a fixed bed having a height of 3 to 15 cm; heating the granulated product of the spindle-shaped goethite particles or spindle-shaped hematite particles to a temperature of 400 to 700° C. at a temperature rise rate of 10 to 80° C./minute while flowing a reducing gas through the fixed bed at a superficial velocity of 40 to 150 cm/s to reduce the granulated product of the spindle-shaped goethite particles or spindle-shaped hematite particles; and subjecting the obtained granulated product of the spindle-shaped metal particles to surface oxidation to form a surface oxide film on surface thereof, thereby obtaining the granulated product of magnetic metal particles containing iron as a main component;

(4) deaggregating the obtained granulated product of magnetic metal particles using an apparatus having a crushing function for crushing the granulated product of magnetic metal particles by a rotor and a sizing function for forcibly passing the crushed particles through a screen, thereby obtaining crude secondary agglomerates of magnetic metal particles; and (5) subjecting the crude secondary agglomerates of magnetic metal particles to water-washing and then drying.

* * * * *